US012747799B2

(12) United States Patent
Orr et al.

(10) Patent No.: US 12,747,799 B2
(45) Date of Patent: Sep. 29, 2026

(54) CHECK VALVE HAVING PIVOTING LINK

(71) Applicant: Zurn Water, LLC, Milwaukee, WI (US)

(72) Inventors: William M. Orr, Paso Robles, CA (US); Christopher J. Corral, Paso Robles, CA (US); Christopher A. Bruni, Morro Bay, CA (US)

(73) Assignee: Zurn Water, LLC, Milwaukee, WI (US)

( * ) Notice: Subject to any disclaimer, the term of this patent is extended or adjusted under 35 U.S.C. 154(b) by 9 days.

(21) Appl. No.: 18/940,554

(22) Filed: Nov. 7, 2024

(65) Prior Publication Data

US 2025/0155038 A1 May 15, 2025

Related U.S. Application Data

(60) Provisional application No. 63/597,963, filed on Nov. 10, 2023.

(51) Int. Cl.

| | |
|---|---|
| ***F16K 15/06*** | (2006.01) |
| ***F16K 15/03*** | (2006.01) |
| ***F16K 15/18*** | (2006.01) |

(52) U.S. Cl.

CPC ............ *F16K 15/065* (2021.08); *F16K 15/03* (2013.01); *F16K 15/033* (2013.01); *F16K 15/1821* (2021.08)

(58) Field of Classification Search

CPC . F16K 5/065; F16K 5/03; F16K 5/033; F16K 5/1821; Y10T 137/7898

USPC .......................................... 251/253; 137/527

See application file for complete search history.

(56) References Cited

U.S. PATENT DOCUMENTS 169,549 A * 11/1875 Jacobsen ................... F16K 3/26 251/243
226,588 A * 4/1880 Amor .................... B05B 9/0883 239/152
304,741 A * 9/1884 Mansfield .............. B61K 11/02 251/114
413,941 A * 10/1889 Hawkins ............ G05D 16/0683 251/303

(Continued)

FOREIGN PATENT DOCUMENTS

CN 106704643 A 5/2017
CN 107524836 A 12/2017

(Continued)

*Primary Examiner* — William M McCalister
(74) *Attorney, Agent, or Firm* — Husch Blackwell LLP

(57) ABSTRACT

A check valve includes a housing having a fluid flow channel therethrough, a valve seat, a clapper, and a pivot link. The clapper is movable between a closed position where the clapper inhibits fluid flow past the valve seat and a fully open position where the clapper permits fluid flow past the valve seat. The pivot link includes a pivot member supported for rotation about a pivot axis, a first arm rigidly connected to the pivot member and coupled to the clapper, and a second arm rigidly connected to the pivot member and coupled to a biasing member. The pivot link transmits a biasing force from the biasing member to the clapper. An effective biasing force that is transmitted to the clapper while the clapper is in the closed position is greater than an effective biasing force transmitted to the clapper while the clapper is in the fully open position.

20 Claims, 14 Drawing Sheets

(56) References Cited

U.S. PATENT DOCUMENTS

| | | | | |
|---|---|---|---|---|
| 532,779 | A * | 1/1895 | Grubb | F16K 15/06 251/243 |
| 2,927,986 | A | 3/1960 | Phillips | |
| 3,074,429 | A | 1/1963 | Farrow | |
| 3,283,772 | A | 11/1966 | Ensign | |
| 3,482,603 | A | 12/1969 | Outcalt | |
| 3,640,306 | A | 2/1972 | Vogt | |
| 3,687,157 | A | 8/1972 | Whitmer | |
| 3,769,998 | A | 11/1973 | Avant | |
| 3,789,874 | A | 2/1974 | Hills | |
| 3,817,278 | A | 6/1974 | Elliott | |
| 3,990,471 | A | 11/1976 | Schutzer et al. | |
| 3,996,962 | A | 12/1976 | Sutherland | |
| 4,067,356 | A * | 1/1978 | Kreuz | F16K 1/12 137/527 |
| 4,259,983 | A * | 4/1981 | Kessel | F16K 15/1821 137/527.2 |
| 4,357,954 | A | 11/1982 | Hunter | |
| 4,552,174 | A * | 11/1985 | Carl | F16K 15/033 251/303 |
| 4,569,636 | A | 2/1986 | Bauer et al. | |
| 4,637,425 | A * | 1/1987 | Petersen | E03F 7/04 251/74 |
| 5,046,525 | A | 9/1991 | Powell | |
| 5,085,076 | A | 2/1992 | Engelmann | |
| 5,113,649 | A | 5/1992 | Siedlecki, Jr. | |
| 5,236,009 | A | 8/1993 | Ackroyd | |
| 5,341,840 | A * | 8/1994 | Manson | F16K 15/03 137/904 |
| 5,564,467 | A | 10/1996 | Ackroyd | |
| 5,584,315 | A | 12/1996 | Powell | |
| 5,669,405 | A | 9/1997 | Engelmann | |
| 5,709,240 | A | 1/1998 | Martin et al. | |
| 5,711,341 | A | 1/1998 | Funderburk et al. | |
| 5,713,240 | A | 2/1998 | Engelmann | |
| 5,746,246 | A * | 5/1998 | Yokota | F16K 47/0111 137/527 |
| 5,794,655 | A | 8/1998 | Funderburk et al. | |
| 5,836,152 | A | 11/1998 | Schatz | |
| 5,975,128 | A | 11/1999 | Schatz | |
| 6,000,473 | A | 12/1999 | Reilly | |
| 6,050,293 | A | 4/2000 | Lin et al. | |
| 6,152,173 | A * | 11/2000 | Makowan | F16K 15/03 137/553 |
| 6,193,214 | B1 | 2/2001 | Schatz | |
| 6,343,618 | B1 | 2/2002 | Britt et al. | |
| 6,443,181 | B1 | 9/2002 | Powell | |
| 6,443,184 | B1 | 9/2002 | Funderburk | |
| 6,502,598 | B2 | 1/2003 | Engelmann | |
| 6,648,013 | B1 | 11/2003 | Ray | |
| 6,659,126 | B2 | 12/2003 | Dunmire et al. | |
| 6,694,996 | B2 | 2/2004 | Funderburk | |
| 7,025,085 | B2 | 4/2006 | Price et al. | |
| 8,657,065 | B1 * | 2/2014 | Hill | F01N 1/165 181/254 |
| 8,844,562 | B2 | 9/2014 | Powell | |
| 8,875,733 | B2 | 11/2014 | Powell | |
| 8,887,756 | B2 | 11/2014 | Powell | |
| 11,371,402 | B2 * | 6/2022 | Thomas | F01N 13/002 |
| 11,674,609 | B2 | 6/2023 | Bouchard et al. | |
| 2008/0224083 | A1 * | 9/2008 | Hill | F01N 1/10 251/337 |
| 2010/0224280 | A1 * | 9/2010 | Burris | B67D 7/52 141/311 A |
| 2012/0132299 | A1 * | 5/2012 | Cyliax | F16K 15/033 137/527 |
| 2013/0206256 | A1 | 8/2013 | Trudel et al. | |
| 2013/0333502 | A1 * | 12/2013 | Barton | F24F 13/10 74/405 |
| 2016/0061339 | A1 * | 3/2016 | Zellweger | F16K 15/033 137/461 |
| 2017/0089475 | A1 * | 3/2017 | Tanner | F16K 1/205 |
| 2018/0038494 | A1 * | 2/2018 | Thomas | F16K 15/033 |
| 2018/0038495 | A1 * | 2/2018 | Thomas | B23P 15/002 |
| 2018/0051607 | A1 * | 2/2018 | Geer | F01N 1/08 |
| 2020/0224780 | A1 | 7/2020 | Day | |
| 2022/0049487 | A1 | 2/2022 | Bouchard et al. | |
| 2022/0049781 | A1 | 2/2022 | Bouchard et al. | |
| 2022/0049786 | A1 | 2/2022 | Doughty | |
| 2022/0341501 | A1 | 10/2022 | Mri et al. | |
| 2022/0412474 | A1 | 12/2022 | Bouchard et al. | |

FOREIGN PATENT DOCUMENTS

| | | | |
|---|---|---|---|
| CN | 106594332 | B | 11/2018 |
| CN | 214274588 | U | 9/2021 |
| CN | 113700908 | A | 11/2021 |
| CN | 218644868 | U | 3/2023 |
| CN | 218780811 | U | 3/2023 |
| DE | 2639892 | C2 | 9/1978 |
| GB | 1006566 | A | 10/1965 |
| GB | 1563487 | A | 3/1980 |
| JP | 6940304 | B2 | 9/2021 |
| WO | 9621578 | A1 | 7/1996 |
| WO | 2016086902 | A1 | 6/2016 |

* cited by examiner

CHECK VALVE HAVING PIVOTING LINK

CROSS-REFERENCE TO RELATED APPLICATION

This application claims the benefit of U.S. Provisional Patent Application No. 63/597,963 filed Nov. 10, 2023, the entire contents of which is incorporated by reference herein.

TECHNICAL FIELD

The present application relates to a device for backflow prevention, and particularly to a check valve for backflow prevention.

BACKGROUND

Backflow prevention devices are used to prevent backflow or reversal of flow in fluid systems under conditions such as low flow, backpressure, or back siphonage.

SUMMARY

In one independent aspect, a check valve includes: a housing having a fluid flow channel therethrough; a valve seat; a clapper; a pivot link pivotable about a pivot axis that is fixed relative to the valve seat; a member coupling the pivot link and the clapper; and a biasing member. The clapper is movable between a closed position and a fully open position. The clapper is positioned against the valve seat and inhibits fluid flow past the valve seat while the clapper is in the closed position. The clapper is spaced apart from the valve seat and permits fluid flow past the valve seat while the clapper is in the fully open position. The biasing member exerts a biasing force to bias the clapper toward the closed position.

In some aspects, the member is coupled to the pivot link at a point that is offset from the pivot axis by a first distance.

In some aspects, the biasing member exerts the biasing force on the pivot link at a point that is offset from the pivot axis by a second distance that is greater than the first distance.

In some aspects, the biasing member exerts a greater biasing force on the clapper while the clapper is in the closed position than while the clapper is in the fully open position.

In some aspects, the member is a rod.

In some aspects, the member is a first member, and the check valve further includes a second member for transmitting the biasing force from the biasing member to the pivot link, the second member coupled to the pivot link.

In some aspects, the biasing member is a tension spring.

In some aspects, the member is coupled to the pivot link at a point that is offset from the pivot axis along a first line of action, and an angle between the member and the first line of action increases as the clapper moves from the closed position to the fully open position.

In some aspects, the biasing member exerts the biasing force on the pivot link at a point that is offset from the pivot axis along a second line of action, and an angle between the biasing member and the second line of action decreases as the clapper moves from the closed position to the fully open position.

In another independent aspect, a check valve for a backflow preventer includes a housing having a fluid flow channel therethrough, a valve seat, a clapper, a biasing member, and a pivot link pivotable about a pivot axis that is fixed relative to the valve seat. The clapper is movable between a closed position and a fully open position. The clapper is positioned against the valve seat and inhibits fluid flow past the valve seat while the clapper is in the closed position. The clapper is spaced apart from the valve seat and permits fluid flow past the valve seat while the clapper is in the fully open position. The biasing member biases the clapper toward the closed position. The pivot link transmits a biasing force from the biasing member to the clapper. An effective biasing force that is transmitted to the clapper while the clapper is in the closed position is greater than an effective biasing force transmitted to the clapper while the clapper is in the fully open position.

In some aspects, the pivot link transmits the biasing force to the clapper via a member coupling the pivot link and the clapper. The member is coupled to the pivot link at a point that is offset from the pivot axis by a first distance.

In some aspects, the biasing member exerts the biasing force on the pivot link at a point that is offset from the pivot axis by a second distance greater than the first distance.

In some aspects, the pivot link is movable between a first position and a second position. The pivot link is in the first position while the clapper is in the closed position, and the pivot link is in the second position while the clapper is in the fully open position. The pivot link transmits a greater effective biasing force to the clapper in the first position than in the second position.

In some aspects, the check valve further includes a first member for transmitting the biasing force from the pivot link to the clapper, the first member coupled to the pivot link, and a second member for transmitting the biasing force from the biasing member to the pivot link, the second member coupled to the pivot link.

In some aspects, the biasing member is a tension spring.

In some aspects, the pivot link transmits the biasing force to the clapper via a member coupling the pivot link and the clapper. The member is coupled to the pivot link at a point that is offset from the pivot axis along a first line of action, and an angle between the member and the first line of action increases as the clapper moves from the closed position to the fully open position.

In some aspects, the biasing member exerts the biasing force on the pivot link at a point that is offset from the pivot axis along a second line of action, and an angle between the biasing member and the second line of action decreases as the clapper moves from the closed position to the fully open position.

In yet another independent aspect, a check valve includes a housing having a fluid flow channel therethrough, a valve seat, a clapper, and a pivot link. The clapper is movable between a closed position and a fully open position. The clapper is positioned against the valve seat and inhibits fluid flow past the valve seat while the clapper is in the closed position. The clapper is spaced apart from the valve seat and permits fluid flow past the valve seat while the clapper is in the fully open position. The pivot link is pivotable about a pivot axis. The pivot link includes a first arm coupled to the clapper, a second arm coupled to a biasing member, and an elongated rod rigidly connecting the first arm to the second arm. The second arm is positioned proximate a wall of the housing. The elongated rod is offset from the pivot axis of the pivot link. The pivot link transmits a biasing force from the biasing member to the clapper. An effective biasing force that is transmitted to the clapper while the clapper is in the closed position is greater than an effective biasing force transmitted to the clapper while the clapper is in the fully open position.

In some aspects, the second arm is rotatably coupled to the housing about the pivot axis of the pivot link.

In some aspects, the second arm includes a first end and a second end. The pivot axis is positioned between the first end and the second end. The first end is coupled to the biasing member and the second end is coupled to the elongated rod.

In some aspects, the first end of the second arm extends from the pivot axis in a first direction, and the second end of the second arm extends from the pivot axis in a second direction that is different from the first direction.

In some aspects, the second arm includes a pair of second arms, one of the second arms rigidly connected to one end of the elongated rod, another one of the second arms rigidly connected to another end of the elongated rod.

Other aspects of the disclosure will become apparent by consideration of the detailed description and accompanying drawings.

DETAILED DESCRIPTION

Before any embodiments are explained in detail, it is to be understood that the disclosure is not limited in its application to the details of the configuration and arrangement of components set forth in the following description or illustrated in the accompanying drawings. The disclosure is capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Figure 1:
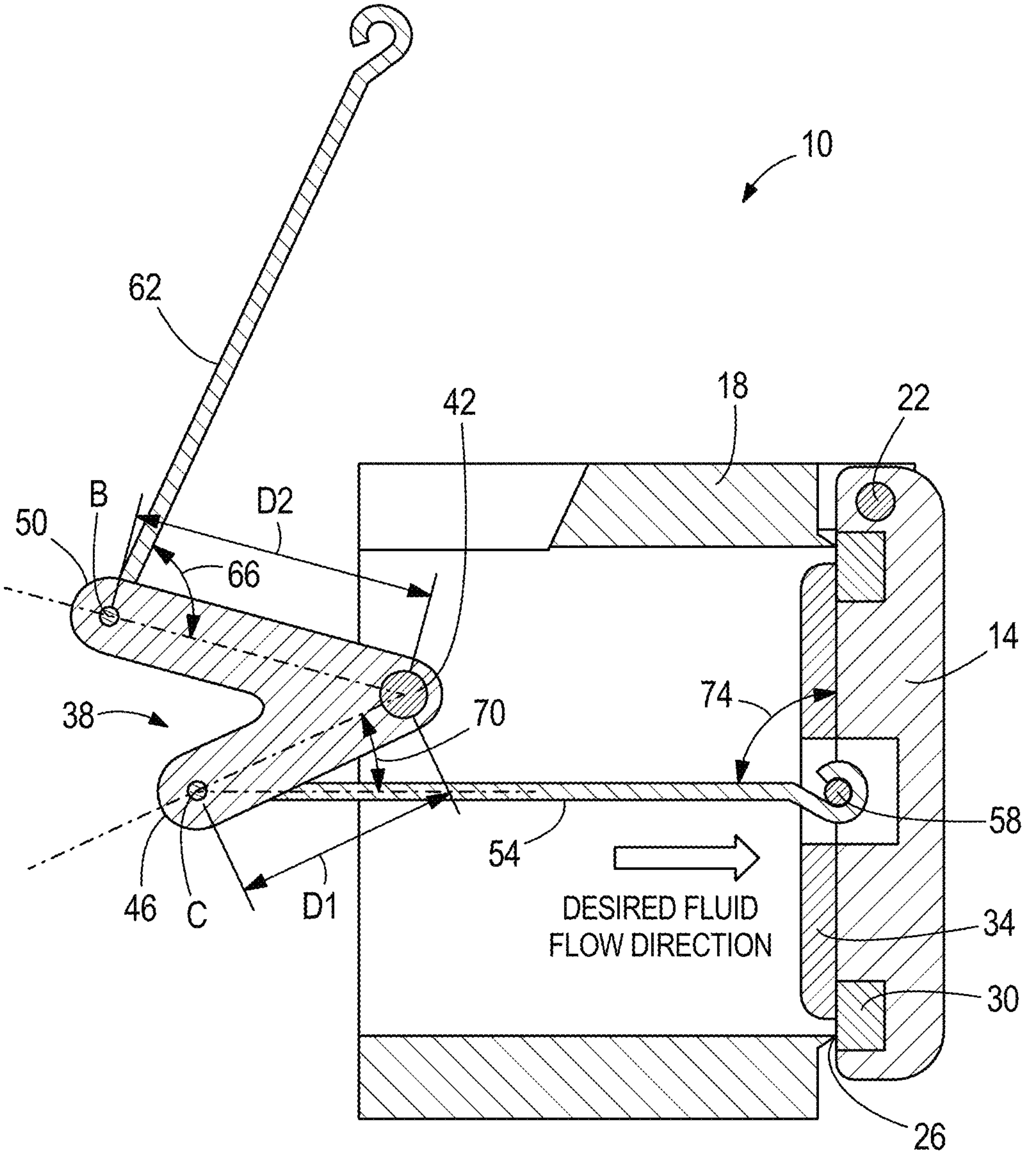
FIG. 1 is a cross-sectional view of a check valve in a closed position.
Figure 2:
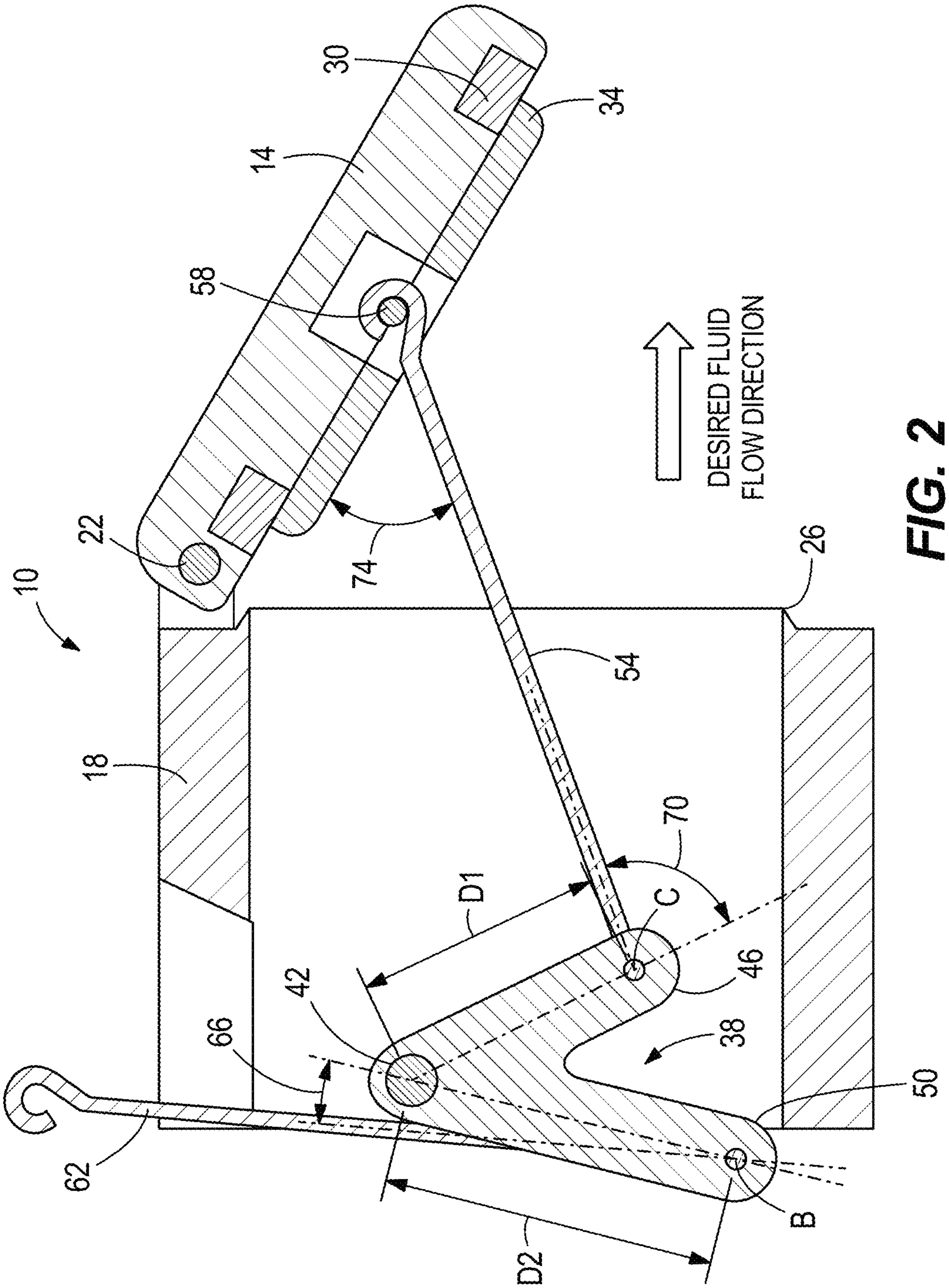
FIG. 2 is a cross-sectional view of the check valve of FIG. 1 in an open position.

As shown in FIGS. 1 and 2, a check valve 10 includes a poppet or plunger or clapper 14 that may be pivotally connected to a housing or main body 18 of the valve 10. The main body 18 may have a generally tubular shape and may be installed in-line with a fluid system. In other embodiments, the main body 18 may have a different shape. The clapper 14 may pivot about a clapper rotation axis, which may be defined by a pin 22 coupling the clapper 14 and body 18 or any other hinged or pivot-style connection. The clapper 14 may pivot relative to the body 18 between a closed position (FIG. 1) in which the clapper 14 engages a valve seat 26 of the body 18, and an open position (FIG. 2) in which the clapper 14 is spaced apart from the valve seat 26.

In the closed position, the clapper 14 can block and prevent water or fluid from flowing through the valve 10. The clapper 14 may include a seal ring 30 (e.g., an O-ring or gasket) that engages the valve seat 26 and assists in creating a fluid-tight seal between the clapper 14 and the valve seat 26. The seal ring 30 may be installed in a groove in the clapper 14 that aligns with the valve seat 26, and a retainer 34 may be included on the upstream face of the clapper 14 to aid in holding the seal ring 30 in the groove. When fluid flows in the desired direction (as indicated in FIGS. 1 and 2), the fluid exerts a force on the clapper 14 that urges the clapper 14 to pivot toward the open position and allow the fluid to flow through the valve 10. However, if there is backpressure or fluid flow in the opposite direction of desired flow, the clapper 14 may be forced against the valve seat 26 to inhibit backflow.

To ensure that the clapper 14 remains in the closed position in a backflow condition, the clapper 14 may be biased toward the closed position. For example, one or more springs may bias the clapper 14 toward the closed position, while still allowing the force of fluid flow in the desired direction to pivot the clapper 14 toward the open position when the force of fluid flow is greater than the biasing force of the spring(s).

In some circumstances, fluid flowing through a backflow preventer valve may experience an additional pressure loss or pressure drop when overcoming the bias force of the spring(s) to either open a clapper or keep the clapper in the open position. Such pressure drops are generally not desirable, so it may be desirable to reduce the biasing force on the clapper. However, the biasing force must also be sufficient to ensure that the clapper is biased and held in the closed position whenever fluid is not flowing in the desired direction. If the biasing force is too weak, a valve may not effectively prevent backflow.

As shown in FIGS. 1 and 2, the valve 10 includes a pivot link 38 that is pivotably coupled to the body 18 about pivot link rotation axis 42. In the illustrated embodiment, the pivot link 38 includes a first portion or clapper arm 46 and a second portion or spring arm 50. The clapper arm 46 may be coupled to the clapper 14 and the spring arm 50 may be coupled to a spring member (not shown) to transfer the biasing force of the spring member to the clapper 14. A first link (e.g., a clapper rod 54) may be coupled to the clapper arm 46 at one end at a distance D1 from the pivot link rotation axis 42. Another end of the clapper rod 54 may be coupled to the clapper 14. In some embodiments, the clapper 14 may include a cross-bar or shaft 58 to receive a hook or looped-end of the clapper rod 54 and allow the clapper rod 54 to stay connected to and provide a biasing force to the clapper 14 throughout its rotation. A similar connection may couple the clapper rod 54 and the clapper arm 46. In other embodiments, another type of connection may be used at one or both ends of the clapper rod 54.

A spring rod 62 includes one end that may be coupled to the spring arm 50 at a distance D2 from pivot link rotation axis 42. Another end of the spring rod 62 may be coupled to a spring member (not shown). The spring member may be an extension spring, such as a coil tension spring, and may be made of spring steel, an elastomeric material, a plastic, or other materials capable of providing a spring force. An end of the spring member may be coupled to a fixed point such that the length of the spring member changes as the pivot link 38 rotates, and consequently, the force exerted by the spring member changes due to the change in length. The spring member may be located entirely within, partially within, or entirely outside of the body 18 of the valve 10. In some embodiments, the spring rod 62 may be omitted and the spring member may connect directly to the spring arm 50 of the pivot link.

The spring member may exert a force on the pivot link 38 when the clapper 14 is in the closed position as shown in FIG. 1. In the illustrated embodiment, a spring pivot angle 66 extends between the spring rod 62 and a spring offset line of action that extends between the pivot link rotation axis 42 and the point of connection B between the spring rod 62 and the pivot link 38. Similarly, a clapper pivot angle 70 extends between the clapper rod 54 and a clapper offset line of action that extends between the pivot link rotation axis 42 and the point of connection C between the clapper rod 54 and the pivot link 38. The spring force creates a torque on the pivot link 38, which can in turn create a biasing force on the clapper 14 via the clapper rod 54. The amount of torque exerted on the pivot link 38 by the spring member generally depends on a magnitude of the spring force, the offset distance D2 (i.e., the distance between the rotation axis 42 and the point of connection between the spring rod 62 and the pivot link 38), and the spring pivot angle 66. Similarly, a linear force exerted on the clapper rod 54 generally depends on a magnitude of the torque on the pivot link 38, the clapper pivot angle 70, the distance D1 (i.e., the distance between the rotation axis 42 and the point of connection between the clapper rod 54 and the pivot link 38), and an angle between the clapper line of action and the spring line of action (e.g., the angle between the clapper arm 46 and the spring arm 50 as shown in FIG. 1).

As the clapper 14 rotates toward the open position, the clapper rod 54 that is connected to the clapper 14 may pull the pivot link 38 about the pivot link rotation axis 42 (e.g., in a counterclockwise direction as shown in FIG. 1). As the pivot link 38 rotates, the spring pivot angle 66 and clapper pivot angle 70 may vary. For a given valve, the offset distances D1 and D2 may be fixed, and the effective spring force that is transferred from the spring member to the clapper 14 varies as the pivot link 38 rotates due to the changing spring pivot angle 66 and clapper pivot angle 70. The magnitude of the spring force may also vary due to changes in the length of the spring member as the pivot link 38 rotates. In some embodiments, the changes in the spring pivot angle 66 and the clapper pivot angle 70 may have a greater effect on the effective spring force on the clapper 14.

The transmission of force/torque depends on the spring pivot angle 66 and the clapper pivot angle 70. For example, the force/torque transfer may be at a maximum when one of the angles 66, 70 is 90° (i.e., having a multiplying factor of 1), may be at a minimum when one of the angles 66, 70 is 0° or 180° (having a multiplying factor of 0), and may vary for values therebetween according to a sine function. As shown in the illustrated embodiments in FIGS. 1 and 2, the transfer of spring force to torque is greater when the clapper 14 is in the closed position than when the clapper 14 is in the fully open position (e.g., when the clapper is moved to its maximum position away from the valve seat 26) because the spring pivot angle 66 is larger in the closed position. In some embodiments the clapper may reach a fully open position after the clapper moves past a predetermined point (for example, once the clapper has rotated 45 degrees or more away from the closed position). Conversely, the transfer of torque to linear force in the clapper rod 54 is less when the clapper 14 is in the closed position than when the clapper 14 is in the fully open position because the clapper pivot angle 70 is less in the closed position. However, due to the sinusoidal relationship of the force/torque transfer, these corresponding decreases and increases are not equivalent in magnitude, and the angles may be configured such that the overall transmission of the spring force is reduced as the clapper 14 rotates open.

For example, when the clapper 14 is in the closed position, the spring pivot angle 66 may be approximately 90 degrees +/−45 degrees, and the clapper pivot angle 70 may be between approximately 5 degrees and 45 degrees. The net effect in such a configuration can be that the effective spring force transferred to the clapper 14 generally reduces as the clapper 14 rotates open, and the pressure loss due to the fluid flow keeping the clapper 14 open similarly reduces the more the clapper 14 rotates open. Further, as shown in the illustrated embodiments in FIGS. 1 and 2, an angle 74 between the clapper rod 54 and the clapper 14 is nearly 90 degrees when the clapper 14 is in the closed position, and the clapper-rod angle 74 decreases to substantially less than 90 degrees as the clapper 14 rotates open. This can similarly reduce the effective closing force or torque on the clapper 14, further resulting in reduced pressure loss as the clapper 14 rotates open.

As illustrated in FIGS. 1 and 2, the distance D2 may be greater than the distance D1. This can provide greater "torque leverage" to the spring rod 62 that connects to the spring member than to the clapper rod 54 that connects to the clapper 14. Consequently, a decrease in the spring pivot angle 66 may have greater leverage or effect on the effective spring force than a similar increase in the clapper pivot angle 70 as the clapper 14 rotates open.

While the angle between the clapper arm 46 and the spring arm 50 is shown as 40 degrees in FIG. 1, the angle between the clapper and spring arms 46, 50 may be selected to be smaller or larger. The spring pivot angle 66 and the clapper pivot angle 70 are configured to vary and reduce the effective spring force as the clapper 14 rotates open. In some embodiments, the clapper arm 46 and spring arm 50 may be formed in a different manner, and/or the pivot link 38 may have a different shape.

As described and illustrated in FIGS. 1 and 2, a tension spring member biases the pivot link 38 in a first direction (e.g., clockwise as illustrated) about pivot link rotation axis 42. The spring arm 50 may be oriented in a substantially transverse or even perpendicular direction to the direction of fluid flow through the valve 10 when the clapper 14 is rotated to a fully open position. In this orientation, the fluid flow can generate a force against the spring arm 50 that exerts a biasing force or torque in a second direction (e.g., counterclockwise as illustrated) about the pivot link rotation axis 42. The flowing fluid can act to reduce some of the torque generated by the spring member, and the effective spring force transferred to the clapper 14 may be further reduced as the clapper 14 rotates open. As shown in FIG. 1, the spring arm 50 may be oriented substantially more parallel to the direction of fluid flow when the clapper 14 is in the closed position, and thus, the counteracting torque on the spring arm 50 may be decreased.

The illustrated embodiments shown and described in FIGS. 1 and 2 incorporate a tension spring member and rods 54, 62 that are in tension to bias the clapper 14 toward a closed position. In other embodiments, a compression spring member may be positioned on an opposite side of the pivot link 38 but along a similar line of action to bias the clapper 14 toward the closed position. In yet other embodiments, the pivot link may be positioned downstream of the clapper 14 such that the clapper rod 54 is in compression to bias the clapper 14 toward the closed position.

Figure 3:
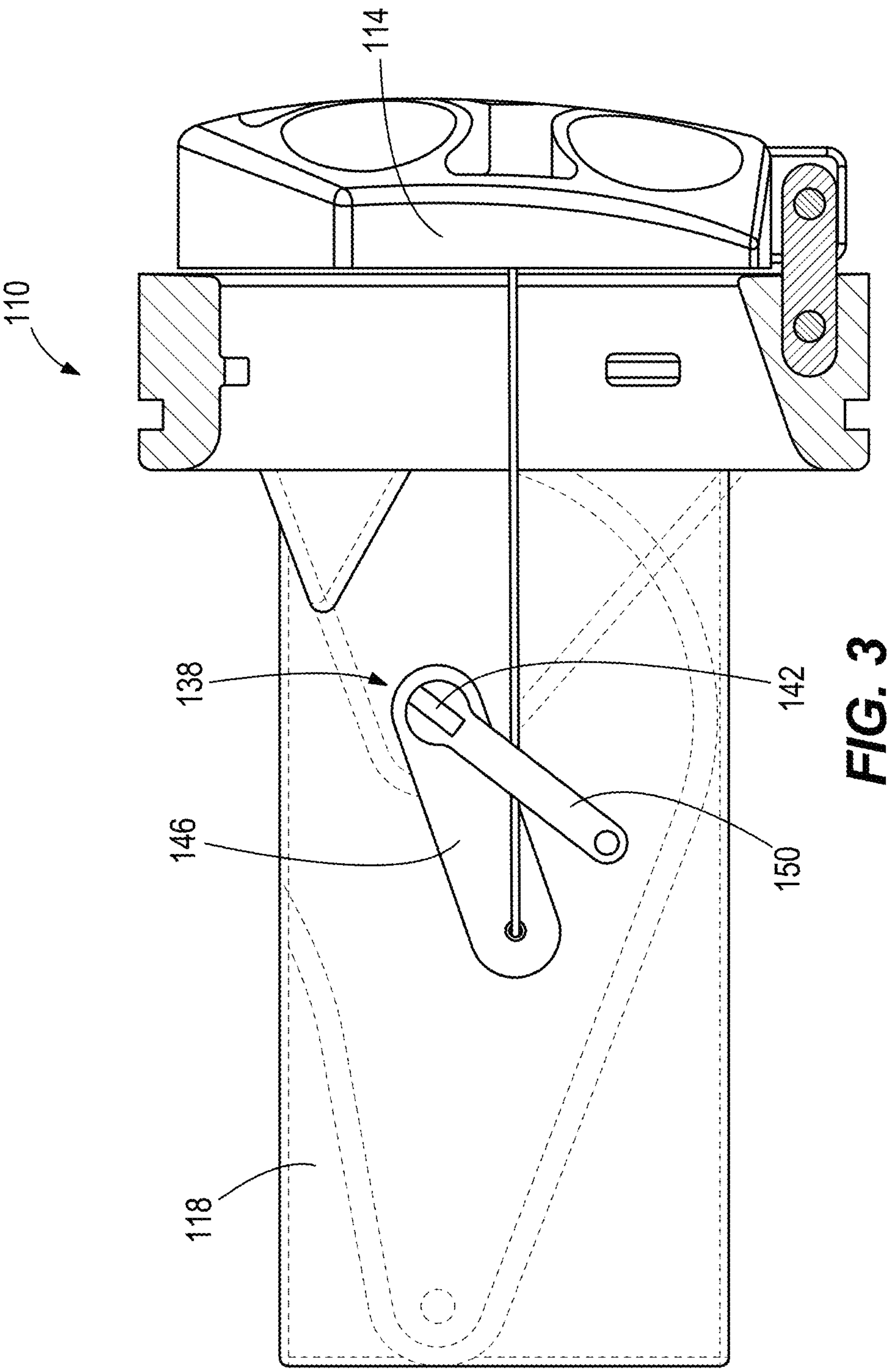
FIG. 3 is a side view of a check valve according to another embodiment in a closed position.
Figure 4:
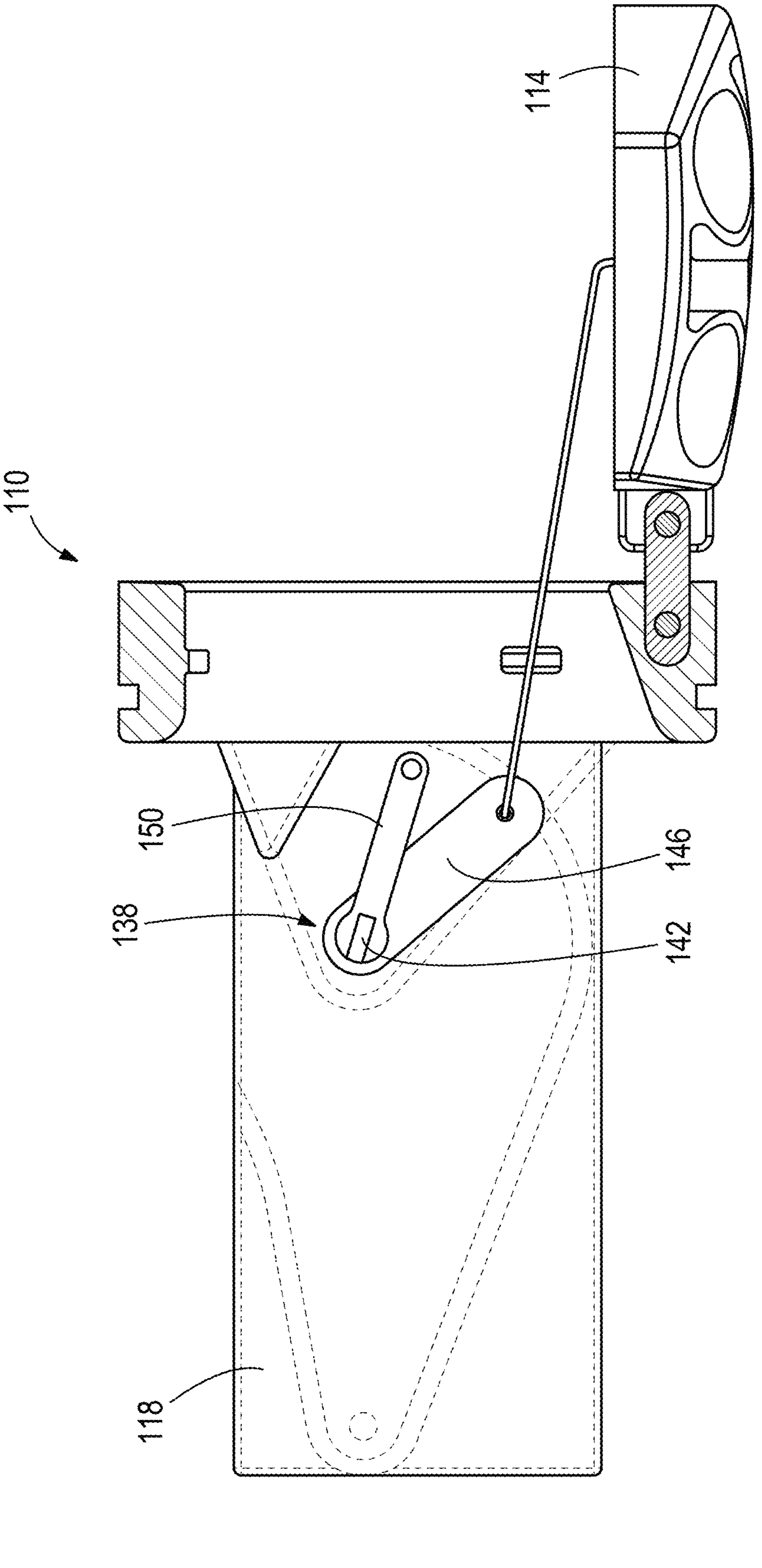
FIG. 4 is a side view of the check valve of FIG. 3 in an open position.
Figure 5:
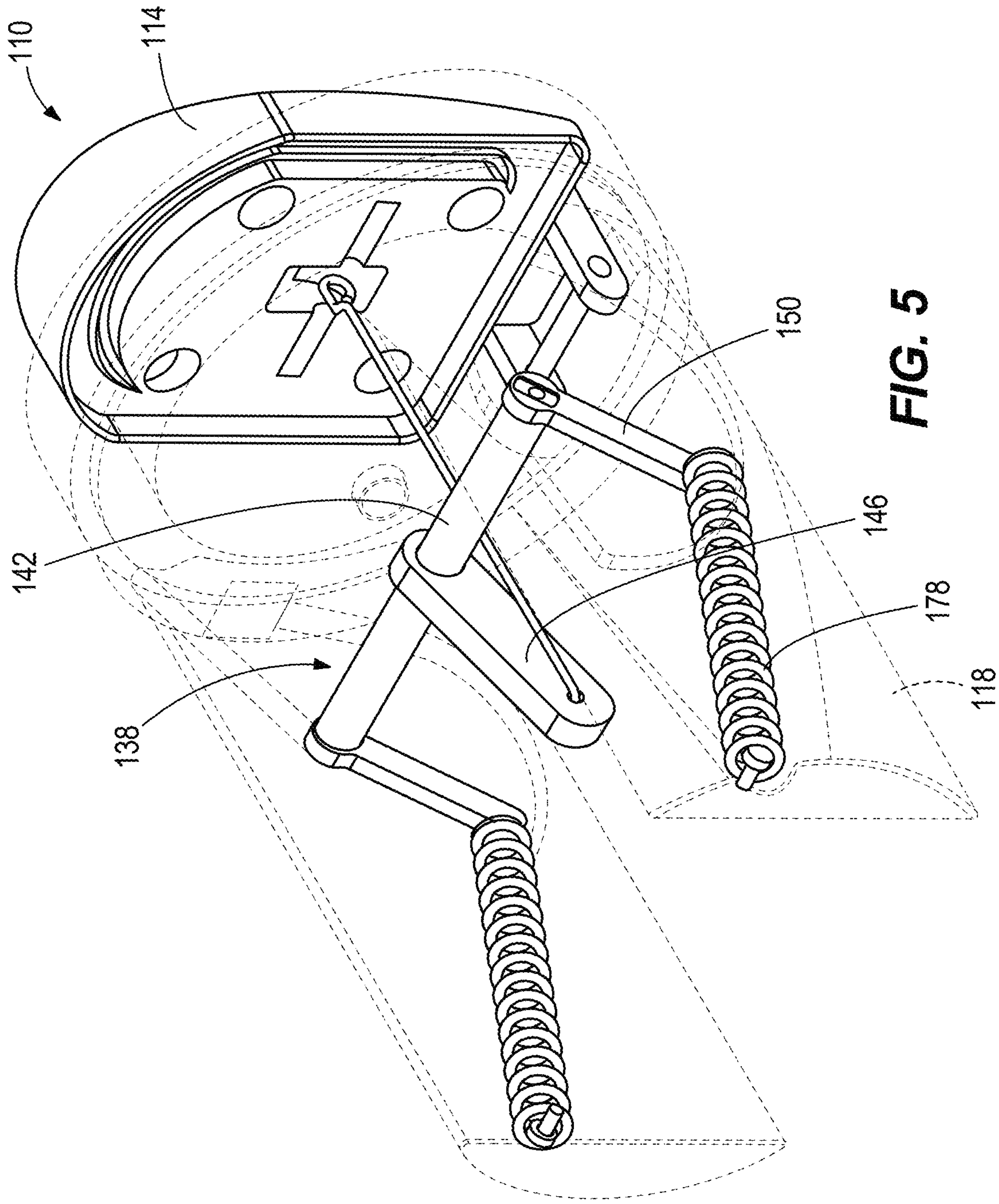
FIG. 5 is a perspective view of the check valve of FIG. 3 in a closed position.
Figure 6:
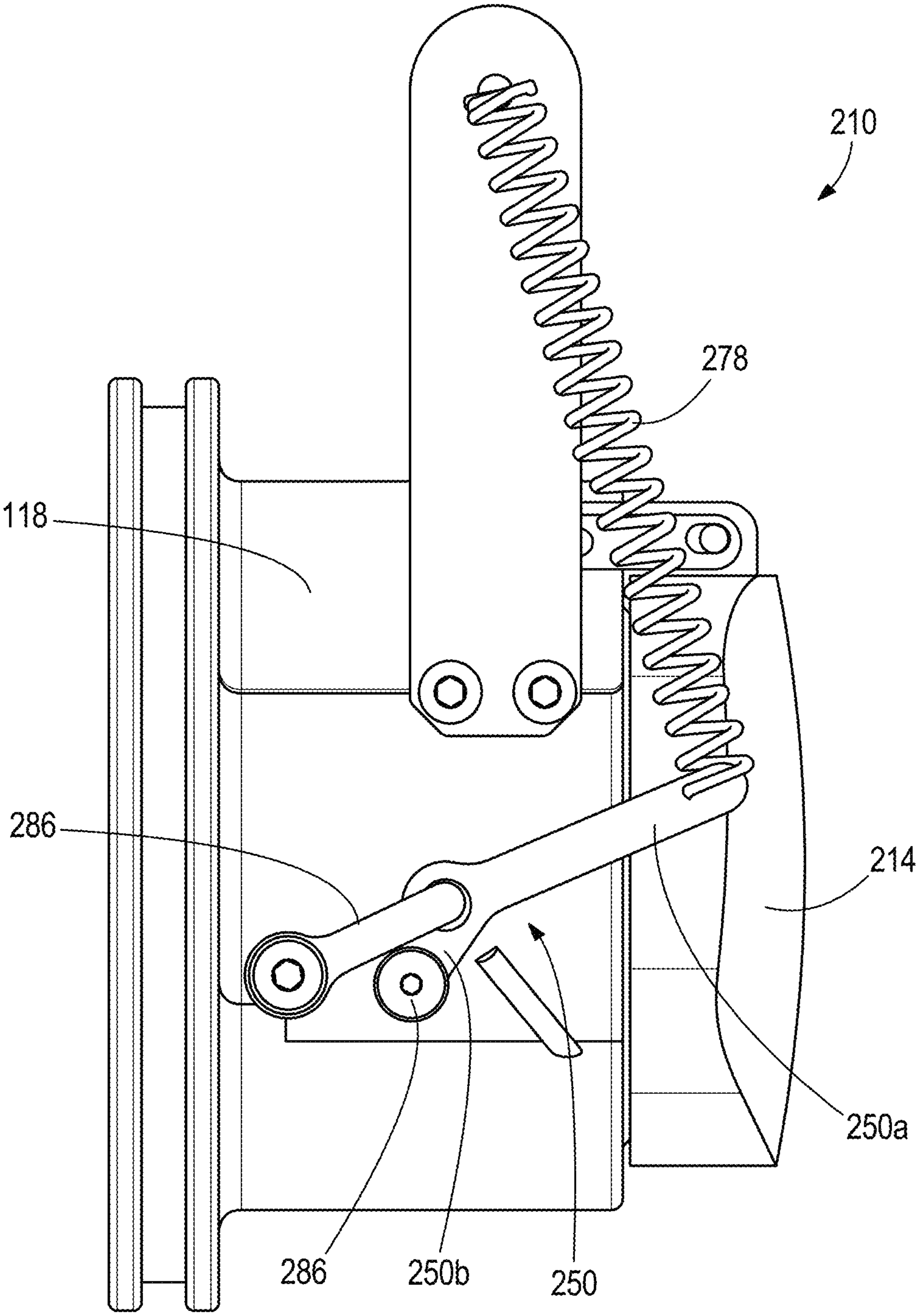
FIG. 6 is a side view of a check valve according to another embodiment in a closed position.
Figure 7:
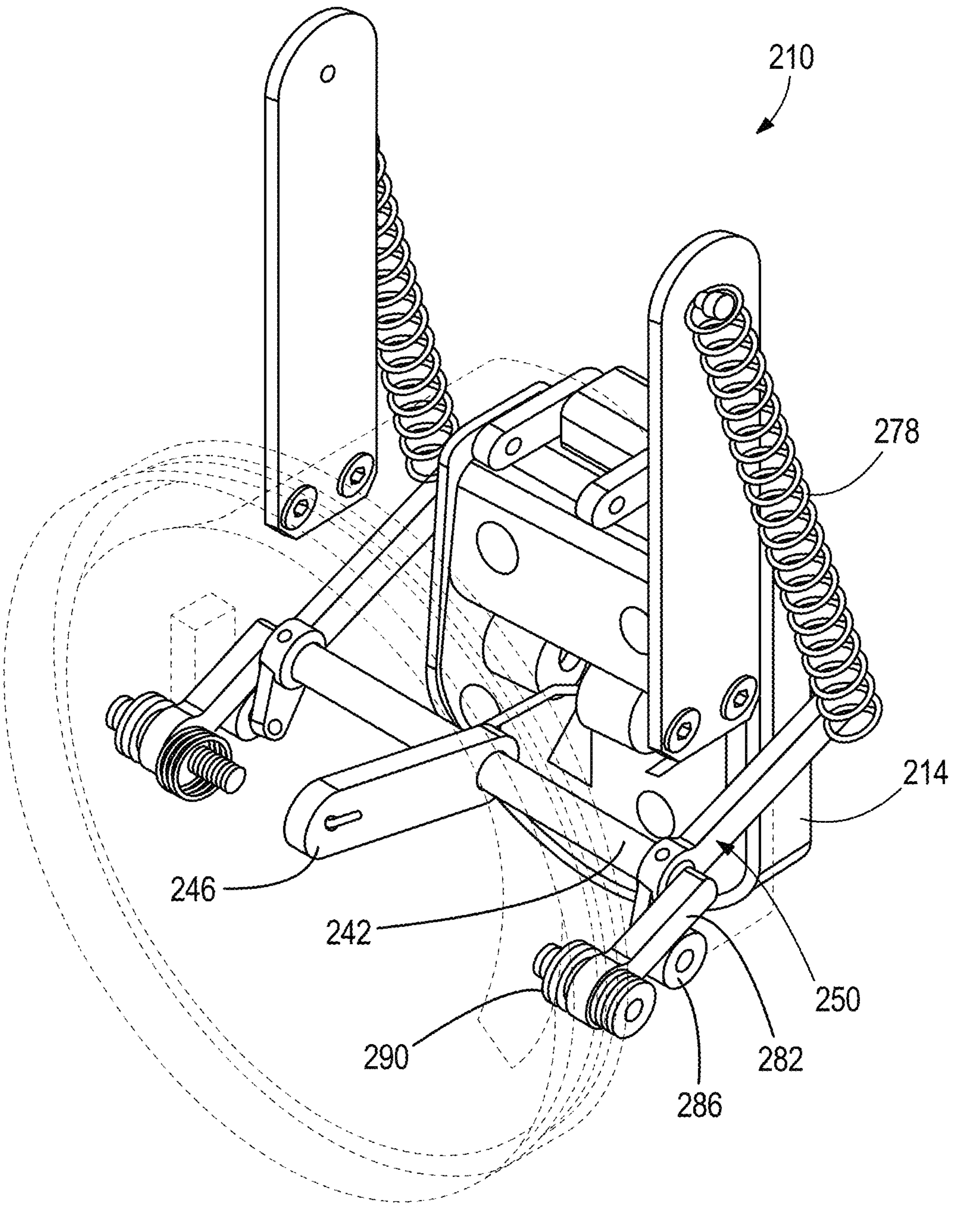
FIG. 7 is a perspective view of the check valve of FIG. 6 in a closed position.

FIGS. 3-5 illustrate a check valve 110 according to another embodiment. Features that are similar to features of the check valve 10 shown in FIGS. 1 and 2 are identified with similar reference numbers, plus 100. Some similarities and differences between the check valve 110 and check valve 10 are described herein.

As best shown in FIG. 5, a pivot link 138 may include a clapper arm 146 disposed in a central portion of the fluid flow path between sides of a body 118 while spring arms 150 may be disposed proximate the sides of the body 118. In the illustrated embodiment, the spring arms 150 are generally outside a main portion of a fluid flow path (e.g., the clapper arm 146 may reside in a different plane than the spring arm(s) 150). Additionally, springs 178 that connect to the spring arms 150 may also be located proximate sides of the body 118 and generally outside of the main portion of the fluid flow path. As shown, each of the springs 178 may be a tension spring and may be coupled to the body 118 at one end and directly coupled to the spring arm 150 at another end. As shown in the illustrated embodiment in FIGS. 3-5, the spring arms 150 and springs 178 may be located on an external portion of the body 118 so that they are out of the fluid flow path. In other embodiments, the spring arms 150 and springs 178 may be located internal to the body 118, and the body 118 may include a recessed portion that can accommodate the spring arms 150 and springs 178 such that these components are positioned away from a center of the fluid flow path.

The clapper arm 146 and the spring arms 150 may each be rigidly attached to a pivot link rotation rod 142 such that the rotation of the clapper arm 146 results in the rotation of the spring arms 150 and vice versa and such that the torque may be transferred between the clapper arm 146 and the spring arm 150.

As best shown in FIGS. 3 and 4, the clapper arm 146 that is in the path of fluid flow may be oriented generally parallel to the direction of fluid flow when the clapper 114 is in the closed position (FIG. 3), and the clapper arm 146 may be more perpendicular to the direction of the fluid flow when the clapper 114 is in the fully open position (FIG. 4). The fluid flow may create a larger torque on the clapper arm 146 in the fully open position, which counteracts the force(s) exerted by the springs 178. Because the spring arms 150 are located proximate the sides of the main fluid flow path, the force/torque generated by fluid flow on the spring arms 150 is generally smaller than any force/torque generated by fluid flow against the clapper arm 146. Thus, this configuration can result in a reduced net torque on the clapper 114 in the fully open position compared to the closed position. The net torque can also be reduced in the fully open position compared to the closed position by configuring the angles and effective distances on the various components to alter the force/torque transfer function, as described above in relation to check valve 10.

FIGS. 6-9 illustrate a check valve 210 according to another embodiment. Features that are similar to features of the check valve 110 shown in FIGS. 3-5 are identified with similar reference numbers, plus 100. Some similarities and differences between the check valve 210 and check valve 110 are described herein.

As shown in FIGS. 6-9, the check valve 210 may include an additional pivot arm or helper arm 282 that provides an additional biasing force on the spring arm 250 in addition to the springs 278 connected to the spring arm 250. The spring arm 250 and the helper arm 282 may interface via a roller 286 to provide smoother movement as the spring arm 250 and helper arm 282 each rotate while still providing continuous contact and biasing force transfer from the helper arm 282 to the spring arm 250. For example, as shown in the illustrated embodiment, a roller 286 is coupled to the spring arm 250, and the helper arm 282 can bias the spring arm 250 via the roller 286 with minimal friction created between the spring arm 250 and helper arm 282. In other embodiments, the roller may be included on the helper arm 282.

The helper arm 282 may be independently biased by a separate biasing member or spring 290. For example, as shown in the illustrated embodiment, the spring 290 that biases the helper arm 282 may be a torsional spring. As shown, the helper arm 282 may contact the spring arm 250 or the roller 286 on a secondary spring arm 250*b* that extends in a different direction from the pivot link rotation rod 242 compared to the primary spring arm 250*a* that the main biasing spring 278 connects to. This configuration may reduce undesired interference between the various components. In other embodiments, the helper arm 282 and the main biasing spring 278 may both interact with a primary spring arm 250*a*.

The primary and secondary spring arms 250*a*, 250*b* may be rigidly connected to each other, either directly or indirectly, such that each rotates with the other. Further, the primary and secondary spring arms 250*a*, 250*b* may each directly or indirectly be rigidly connected to the pivot link rotation rod 242 such that the biasing torque from both the helper arm 282 and the spring connected to the primary spring arm 250*a* is transferred through the pivot link rod 242 to the clapper arm 246 to create a combined effective biasing force on the clapper 214.

Figure 10:
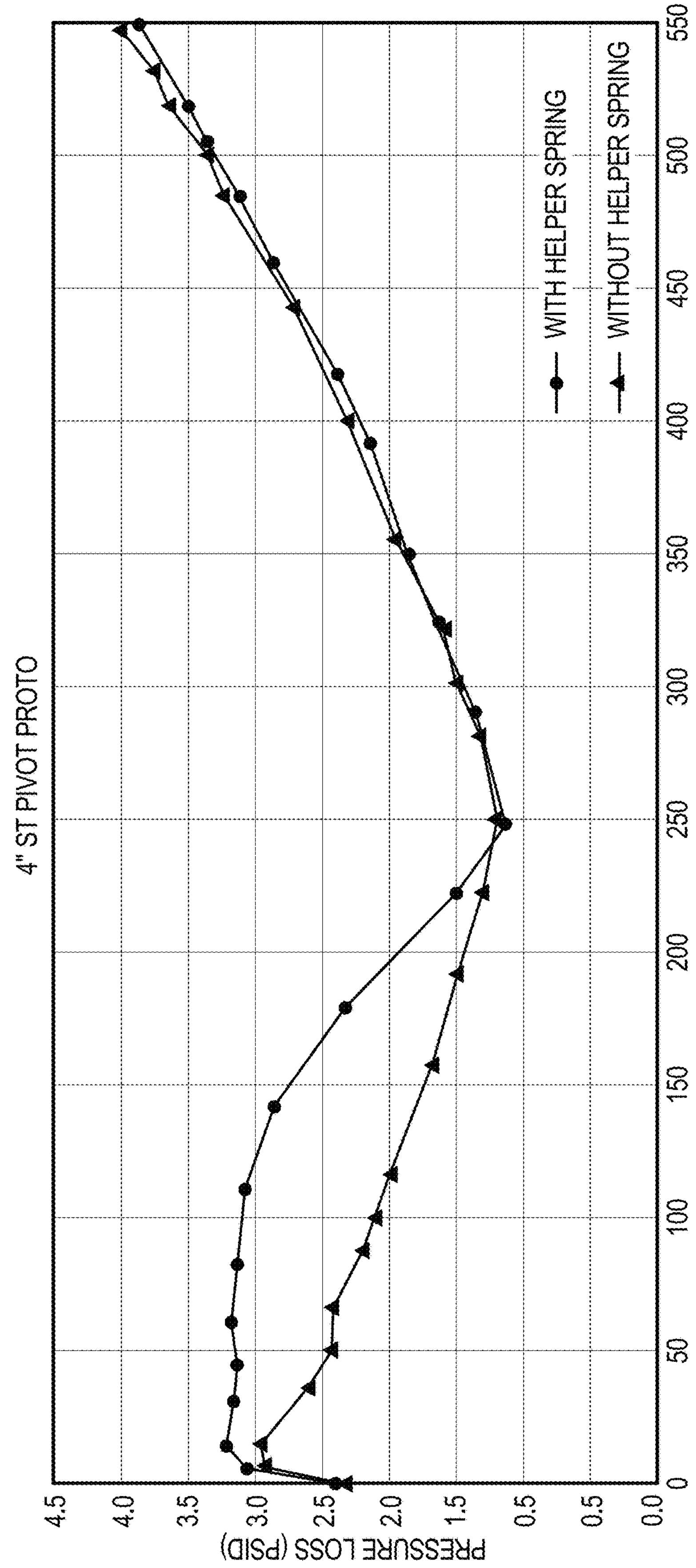
FIG. 10 is a graphical representation of pressure differential versus flowrate for the check valve of FIG. 6 with and without a "helper spring."

The transferred effective biasing forces of both the helper arm 282 and the main biasing spring 278 to the clapper 214 may be configured to create a combined effective biasing force on the clapper 214 that is smoother and more consistent as the clapper 214 first begins to open from its closed position. This can create a smoother opening as initial fluid flow starts or at lower flow rates and can help mitigate flow switch cycling issues, which can be an issue for certain fluid flow systems, including fire suppression systems. For example, when the clapper 214 is in the closed position or first begins to open from its closed position, the helper arm 282 may bias the spring arm 250 in the same rotational direction as the springs 278 connected to the spring arm 250. As shown in FIG. 10, the pressure differential measured for a check valve 210 using a biased helper arm 282 is smoother and flatter for flow rates between 0 and 100 GPM compared to a check valve not using a helper arm 282, which can have the pressure differential rapidly drop as flowrate initially increases.

Figure 8:
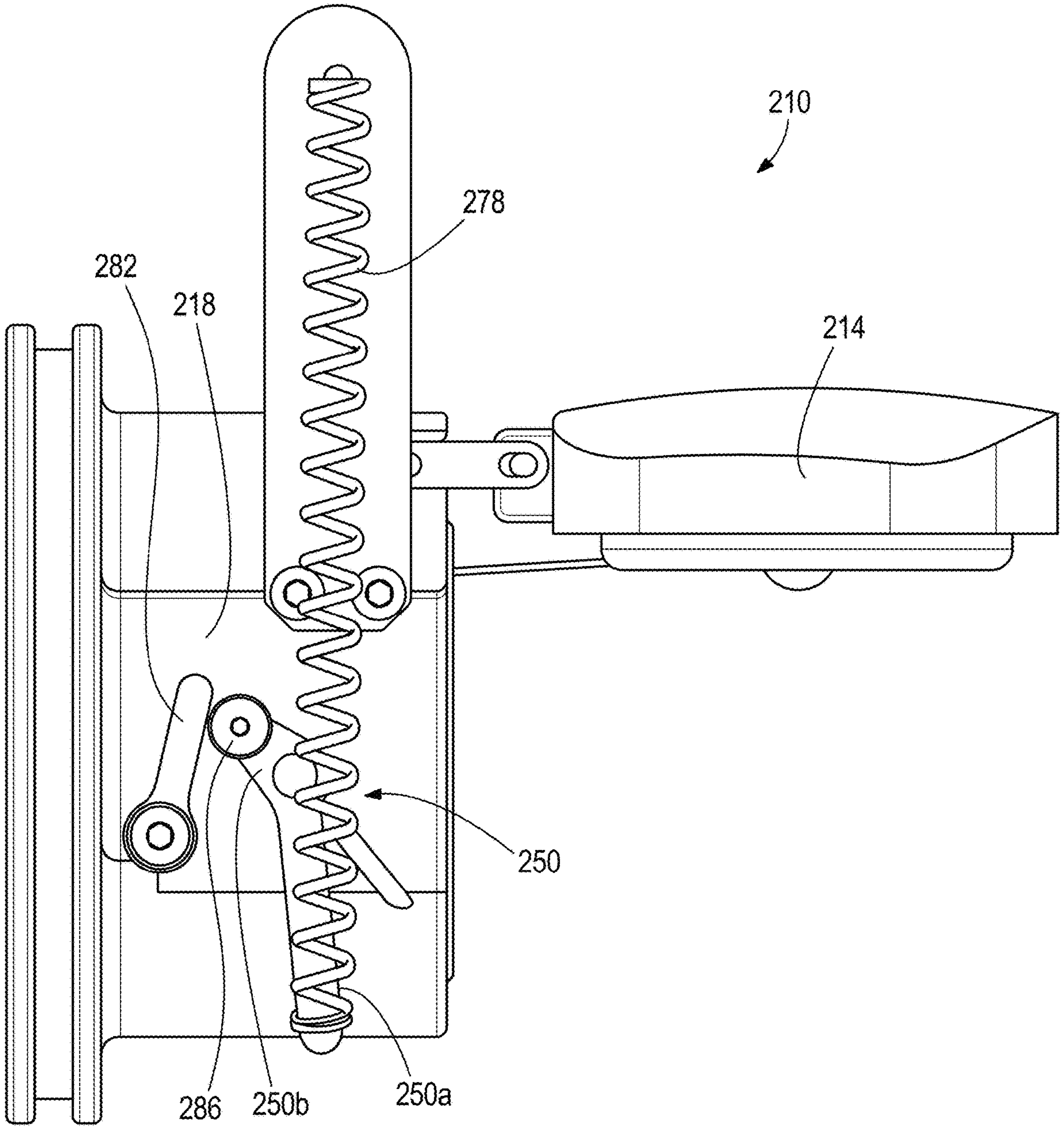
FIG. 8 is a side view of the check valve of FIG. 6 in an open position.
Figure 9:
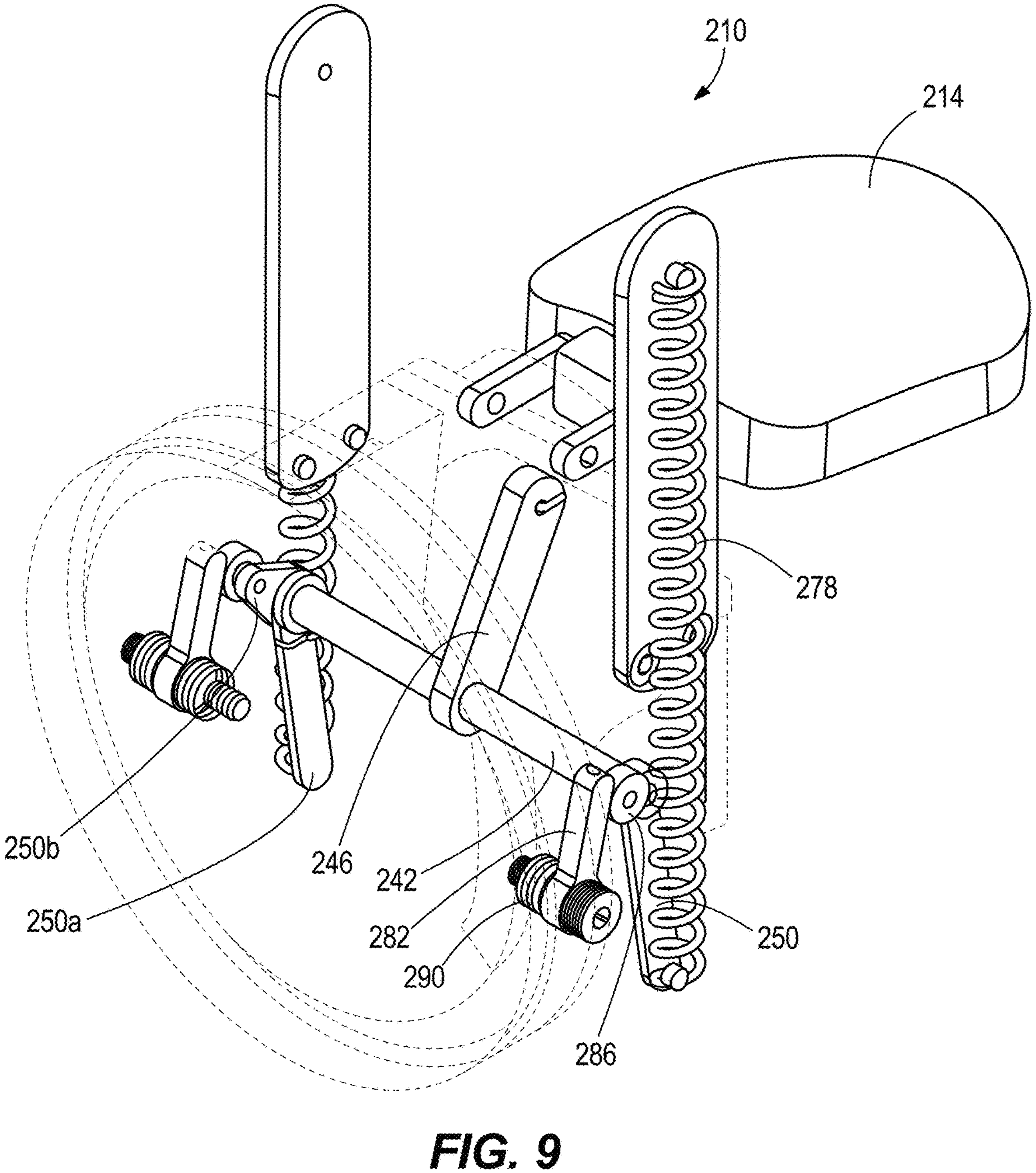
FIG. 9 is a perspective view of the check valve of FIG. 6 in an open position.

As the clapper 214 continues to open, the spring arm 250 and helper arm 282 may rotate to a position such that the helper arm 282 begins to bias the spring arm 250 in the opposite direction as the springs 278 connected to the spring arm 250. As shown in FIGS. 8 and 9, the helper arm 282 may bias the spring arm 250 with such a counteracting force when the clapper 214 is in the fully open position, which can reduce the overall effective force and associated pressure drop in the fully open position. The change in biasing direction of the helper arm 282 may be configured to occur at different opening positions for the clapper 214. The point at which this change in biasing direction occurs may generally be configured by selecting the location of the pivot point of the helper arm 282 relative to the spring arm 250 as well as the starting position or angle of the secondary spring arm 250*b*.

FIGS. 11-14 illustrate a check valve 310 according to another embodiment. Features that are similar to features of the check valve 110 shown in FIGS. 3-5 are identified with similar reference numbers, plus 200. Some similarities and differences between the check valve 310 and check valve 110 are described herein.

Figure 11:
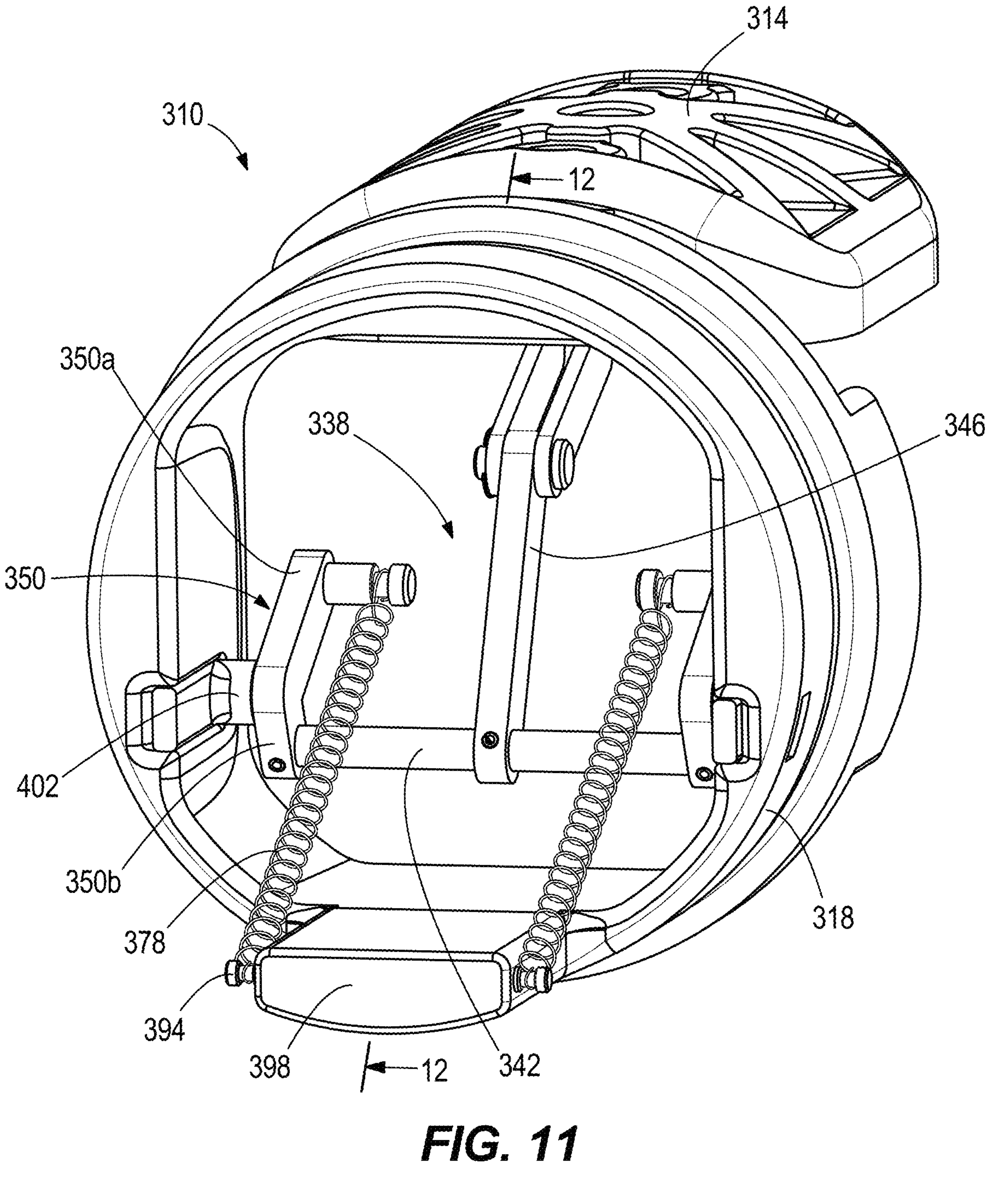
FIG. 11 is a perspective view of a check valve according to another embodiment in an open position.
Figure 12:
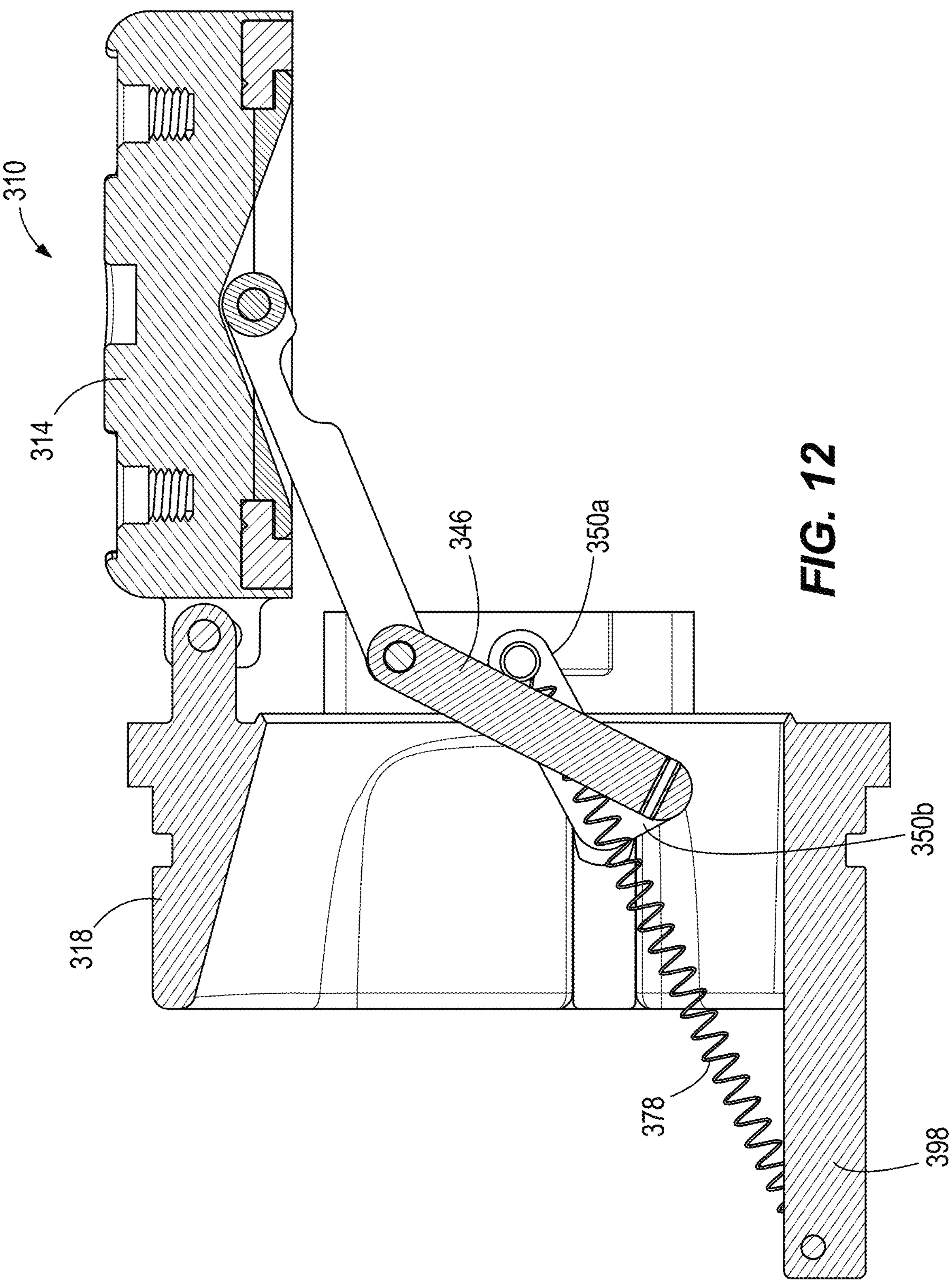
FIG. 12 is a sectional view of the check valve of FIG. 11, viewed along section 12-12.
Figure 13:
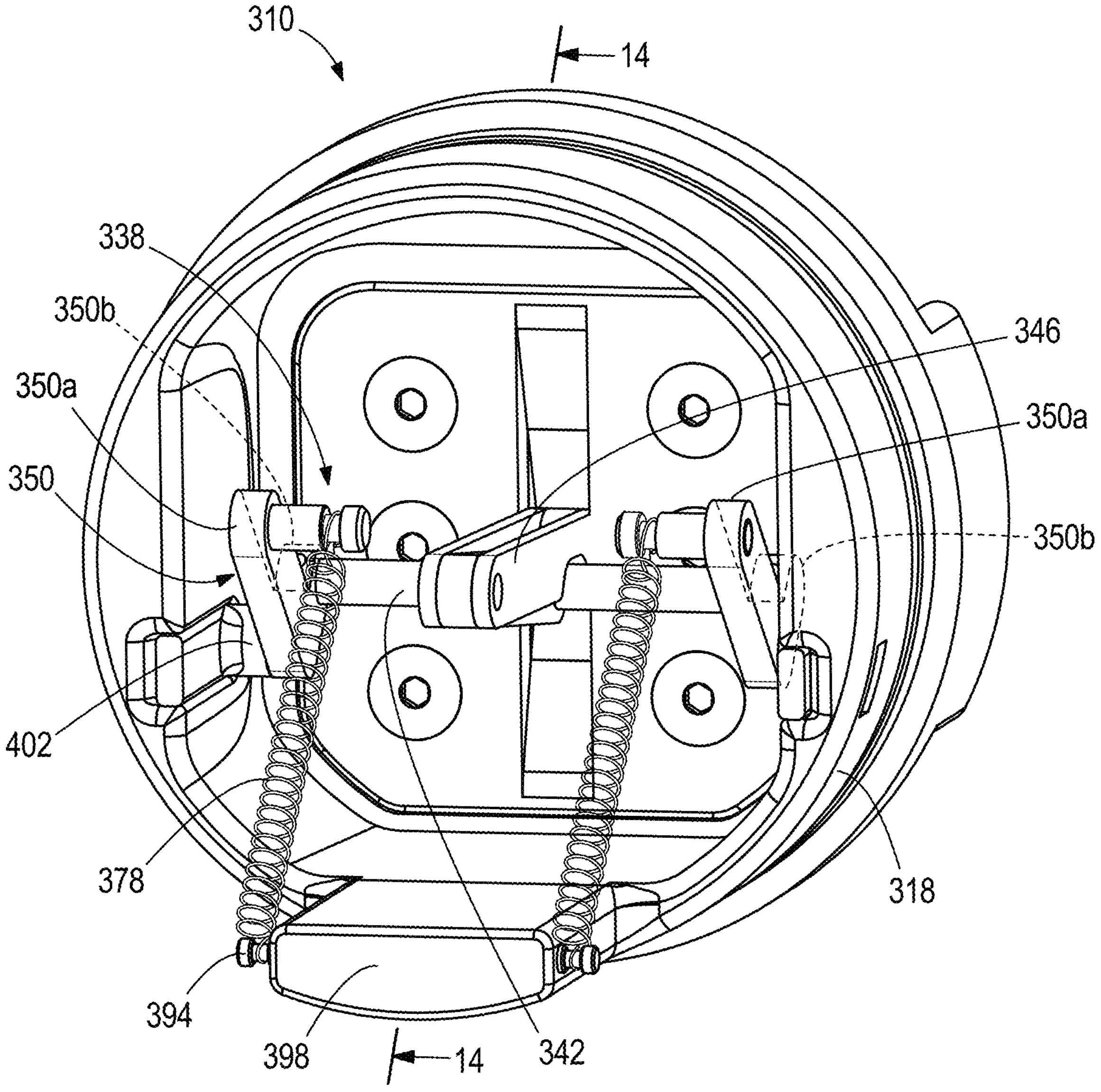
FIG. 13 is a perspective view of the check valve of FIG. 11 in a closed position.

As best shown in FIGS. 11 and 13, a pivot link 338 may include a clapper arm 346 disposed in a central portion of the fluid flow path between sides of a body 318 while spring arms 350 may be disposed proximate the sides of the body 318. In the illustrated embodiment, the spring arms 350 are generally outside a main portion of a fluid flow path (e.g., the clapper arm 346 may reside in a different plane than the spring arm(s) 350). Additionally, springs 378 that connect to the spring arms 350 may also be located proximate sides of the body 318 and generally outside of the main portion of the fluid flow path. As shown, each of the springs 378 may be a tension spring and may be coupled to a protrusion 394 or other fixed point of the body 318 at one end and directly coupled to the spring arm 350 at another end. As shown in the illustrated embodiments in FIGS. 11-14, the protrusions 394 may be located on an extension 398 of the body 318 such that the extension 398 and protrusions 394 are outside a main portion of a fluid flow path through the body 318.

As shown in FIGS. 11 and 13, the clapper arm 346 and the spring arms 350 may each be rigidly attached to a pivot link rotation rod 342 such that the rotation of the clapper arm 346 results in the rotation of the spring arms 350 and vice versa and such that the torque may be transferred between the clapper arm 346 and the spring arm 350. The spring arms 350 may be rotatably coupled to the body 318 about a pivot 402 (as illustrated, the pivot 402 may be part of a insert that snaps into a recess of the body 318 to be held in a fixed position). As shown in FIGS. 11-14, the pivot link rotation rod 342 may be offset from the pivot 402 that the spring arm 350 rotates about (i.e., the pivot link rotation rod 342 may be in a non-coaxial arrangement with the pivot 402). As illustrated, the pivot link rotation rod 342 may couple to the spring arm 350 at one end of the spring arm 350, the spring 378 may couple to the spring arm 350 at a second end of the spring arm 350, and the spring arm 350 may rotate about the pivot 402 located between the first end and second end of the spring arm 350. The first and second ends of the spring arm 350 may extend from the pivot 402 in different directions to form a first spring arm 350*a* and second spring arm 350*b* (e.g., first spring arm 350*a* may be approximately 90° relative to second spring arm 350*b*). This offset or non-colinear arrangement of the first spring arm 350*a* relative to the second spring arm 350*b* can provide clearance for the spring 378 relative to the pivot link rotation rod 342 throughout the rotation of the spring arm 350.

Figure 14:
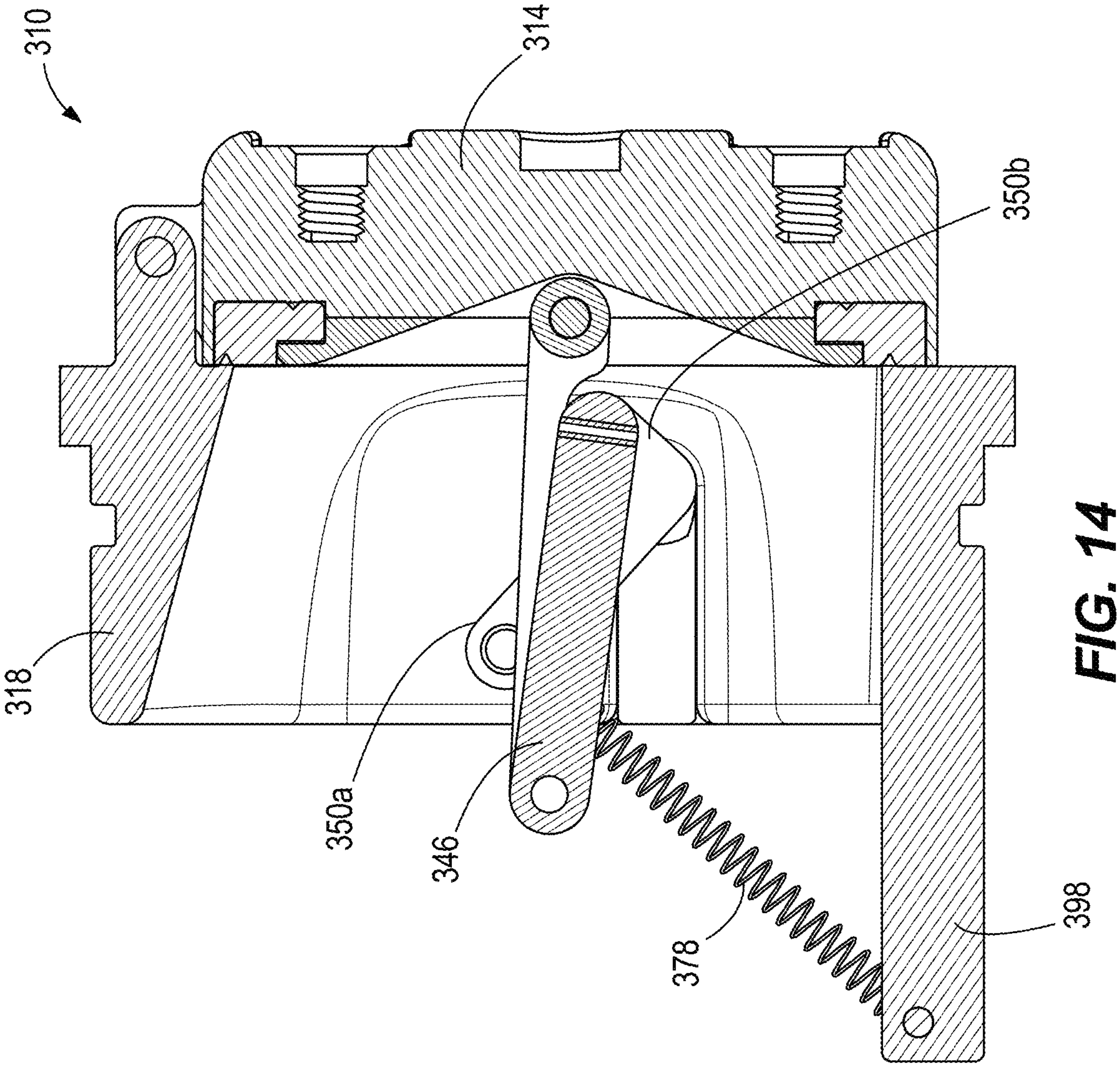
FIG. 14 is a sectional view of the check valve of FIG. 13, viewed along section 14-14.

As best shown in FIGS. 12 and 14, the spring 378 may be oriented substantially parallel relative to the first spring arm 350*a* when the clapper 314 is in the open position (FIG. 12) and may be oriented substantially perpendicular relative to the first spring arm 350*a* when the clapper 314 is in the closed position (FIG. 14). Similar to as described above in regards to check valve 10, the effect in such a configuration can be that the effective spring force transferred to torque about the pivot 402 generally reduces as the clapper 314 rotates from the closed to open position, and the pressure loss due to the fluid flow keeping the clapper 314 open similarly reduces as the clapper 314 rotates from the closed to open position.

The illustrated embodiments shown and described in the figures use a pivotally mounted clapper 14. In other embodiments, the clapper 14 may be supported for translational movement (e.g., the clapper may be supported for sliding movement along rails or slots axially toward and away from the valve seat 26). The effective spring or biasing force may still vary and may be reduced as the clapper 14 moves toward the fully open position due to the rotation of the pivot link 38 as described above. In other embodiments, the clapper 14 may have both a pivoting component and a translational component.

The embodiment(s) described above and illustrated in the figures are presented by way of example only and are not intended as a limitation upon the concepts and principles of the present disclosure. It will be understood that certain features and sub combinations are of utility and may be employed without reference to other features and sub combinations. Features described and illustrated with respect to certain embodiments may also be implemented in other embodiments. This is contemplated by and is within the scope of the claims. Since many possible embodiments of the disclosure may be made without departing from the scope thereof, it is also to be understood that all matters herein set forth or shown in the accompanying drawings are to be interpreted as illustrative and not limiting. As such, it will be appreciated that variations and modifications to the elements and their configuration and/or arrangement exist within the spirit and scope of one or more independent aspects as described.

What is claimed is:

1. A check valve comprising:

a housing having a fluid flow channel therethrough;

a valve seat;

a clapper movable between a closed position and a fully open position, the clapper positioned against the valve seat and inhibiting fluid flow past the valve seat while the clapper is in the closed position, the clapper spaced apart from the valve seat and permitting fluid flow past the valve seat while the clapper is in the fully open position, the clapper biased to move toward the fully open position by fluid flow in a downstream direction through the fluid flow channel;

a pivot link pivotable about a pivot axis that is fixed relative to the valve seat;

a member coupling the pivot link and the clapper; and a biasing member exerting a biasing force to bias the clapper toward the closed position, the biasing force exerted on the clapper having a first magnitude while the clapper is in the closed position and a second magnitude while the clapper is in the fully open position, the first magnitude being greater than the second magnitude.

2. The check valve of claim 1, wherein the member is coupled to the pivot link at a point that is offset from the pivot axis by a first distance.

3. The check valve of claim 2, wherein the biasing member exerts the biasing force on the pivot link at a point that is offset from the pivot axis by a second distance that is greater than the first distance.

4. The check valve of claim 1, wherein the member is a rod.

5. The check valve of claim 1, wherein the member is a first member, the check valve further comprising a second member for transmitting the biasing force from the biasing member to the pivot link, the second member coupled to the pivot link.

6. The check valve of claim 1, wherein the member is coupled to the pivot link at a point that is offset from the pivot axis along a first line of action, wherein a first angle between the member and the first line of action increases as the clapper moves from the closed position to the fully open position.

7. The check valve of claim 6, wherein the biasing member exerts the biasing force on the pivot link at a point that is offset from the pivot axis along a second line of action, wherein a second angle between the biasing member and the second line of action decreases as the clapper moves from the closed position to the fully open position.

8. A check valve for a backflow preventer, the check valve comprising:

a housing having a fluid flow channel therethrough;

a valve seat;

a clapper movable between a closed position and a fully open position, the clapper positioned against the valve seat and inhibiting fluid flow past the valve seat while the clapper is in the closed position, the clapper spaced apart from the valve seat and permitting fluid flow past the valve seat while the clapper is in the fully open position;

a biasing member for biasing the clapper toward the closed position; and a pivot link pivotable about a pivot axis that is fixed relative to the valve seat, the pivot link transmitting an effective biasing force from the biasing member to the clapper, the effective biasing force that is transmitted to the clapper while the clapper is in the closed position being greater than the effective biasing force transmitted to the clapper while the clapper is in the fully open position.

9. The check valve of claim 8, wherein the pivot link transmits the effective biasing force to the clapper via a member coupling the pivot link and the clapper, wherein the member is coupled to the pivot link at a point that is offset from the pivot axis by a first distance.

10. The check valve of claim 9, wherein the biasing member exerts a biasing force on the pivot link at a point that is offset from the pivot axis by a second distance greater than the first distance.

11. The check valve of claim 8, wherein the pivot link is movable between a first position and a second position, the pivot link in the first position while the clapper is in the closed position, the pivot link in the second position while the clapper is in the fully open position, the effective biasing force transmitted by the pivot link from the biasing member to the clapper being greater in the first position than in the second position.

12. The check valve of claim 8, further comprising:

a first member for transmitting the effective biasing force from the pivot link to the clapper, the first member coupled to the pivot link; and a second member for transmitting a biasing force from the biasing member to the pivot link, the second member coupled to the pivot link.

13. The check valve of claim 8, wherein the pivot link transmits the effective biasing force to the clapper via a member coupling the pivot link and the clapper, wherein the member is coupled to the pivot link at a point that is offset from the pivot axis along a first line of action, wherein a first angle between the member and the first line of action increases as the clapper moves from the closed position to the fully open position.

14. The check valve of claim 13, wherein the biasing member exerts a biasing force on the pivot link at a point that is offset from the pivot axis along a second line of action, wherein a second angle between the biasing member and the second line of action decreases as the clapper moves from the closed position to the fully open position.

15. A check valve comprising:

a housing having a fluid flow channel therethrough;

a valve seat;

a clapper movable between a closed position and a fully open position, the clapper positioned against the valve seat and inhibiting fluid flow past the valve seat while the clapper is in the closed position, the clapper spaced apart from the valve seat and permitting fluid flow past the valve seat while the clapper is in the fully open position; and a pivot link pivotable about a pivot axis, the pivot link including, a first arm coupled to the clapper, a second arm coupled to a biasing member, the second arm proximate a wall of the housing, and an elongated rod rigidly connecting the first arm to the second arm, the elongated rod offset from the pivot axis of the pivot link, wherein the pivot link transmits a biasing force from the biasing member to the clapper, an effective biasing force that is transmitted to the clapper while the clapper is in the closed position being greater than an effective biasing force transmitted to the clapper while the clapper is in the fully open position.

16. The check valve of claim 15, wherein the second arm is rotatably coupled to the housing about the pivot axis of the pivot link.

17. The check valve of claim 16, wherein the second arm includes a first end and a second end, the pivot axis positioned between the first end and the second end, wherein the first end is coupled to the biasing member and the second end is coupled to the elongated rod.

18. The check valve of claim 17, wherein the first end of the second arm extends from the pivot axis in a first direction, wherein the second end of the second arm extends from the pivot axis in a second direction that is different from the first direction.

19. The check valve of claim 15, wherein the second arm includes a pair of second arms, one of the second arms rigidly connected to one end of the elongated rod, another one of the second arms rigidly connected to another end of the elongated rod.

20. The check valve of claim 7, wherein the first angle is between 5 degrees and 45 degrees while the clapper is in the closed position, and wherein the second angle is between 45 degrees and 135 degrees while the clapper is in the closed position.

* * * * *